(12) United States Patent
Harwig et al.

(10) Patent No.: US 7,389,166 B2
(45) Date of Patent: Jun. 17, 2008

(54) METHODS TO PREVENT WHEEL SLIP IN AN AUTONOMOUS FLOOR CLEANER

(75) Inventors: Jeffrey L. Harwig, New Berlin, WI (US); Thomas Jaworski, Racine, WI (US); Fukyuen Cheng, Ngau Tau Kok (HK); Seakee Chen, Guangzhou (CN)

(73) Assignee: S.C. Johnson & Son, Inc., Racine, WI (US)

( * ) Notice: Subject to any disclaimer, the term of this patent is extended or adjusted under 35 U.S.C. 154(b) by 277 days.

(21) Appl. No.: 11/168,038

(22) Filed: Jun. 28, 2005

(65) Prior Publication Data
US 2006/0293809 A1    Dec. 28, 2006

(51) Int. Cl.
*G05D 1/00* (2006.01)

(52) U.S. Cl. .......................... 701/23; 701/26; 700/245; 15/300.1; 15/319

(58) Field of Classification Search ............... 701/23, 701/26; 700/245; 15/319, 340.1, 300.1; 180/6.5, 7.1; 318/568.11
See application file for complete search history.

(56) References Cited

U.S. PATENT DOCUMENTS

| | | |
|---|---|---|
| 2,050,202 A | 8/1936 | Sohl |
| 4,446,903 A | 5/1984 | Clinefelter et al. |
| 4,514,243 A | 4/1985 | Moore, III et al. |
| 4,782,550 A | 11/1988 | Jacobs |
| 4,852,667 A * | 8/1989 | Dorleans .................... 175/65 |
| 5,214,822 A * | 6/1993 | Sakurai et al. ............... 15/325 |
| 5,279,672 A | 1/1994 | Betker et al. |
| 5,440,216 A | 8/1995 | Kim |
| 5,634,237 A | 6/1997 | Paranjpe |
| 5,636,402 A | 6/1997 | Kubo et al. |
| 5,815,880 A | 10/1998 | Nakanishi |
| 5,947,225 A | 9/1999 | Kawakami et al. |
| 5,998,953 A | 12/1999 | Nakamura et al. |
| 6,046,565 A | 4/2000 | Thorne |
| 6,099,091 A | 8/2000 | Campbell |
| 6,105,192 A | 8/2000 | Deiterman et al. |
| 6,124,694 A | 9/2000 | Bancroft et al. |

(Continued)

FOREIGN PATENT DOCUMENTS

CA        2531305 A1 * 10/2006

(Continued)

OTHER PUBLICATIONS

International Search Report and Written Opinion dated Jul. 18, 2007 for PCT/US2006/025037.

*Primary Examiner*—Cuong H Nguyen (57) ABSTRACT

Tread structures, wave motion navigational controls, and ramp up recovery controls are provided to an autonomous floor cleaner to reduce wheel slippage. The floor cleaner delivers liquid to the floor as part of the cleaning process. Wheels on the device are provided with relatively deep peripheral grooves to minimize the contact surfaces of a sprocket wheel and to accommodate the layer of liquid on the floor. In the event of wheel slippage, or to prevent wheel slippage, the device is designed to move forward with a slight side-to-side wave action caused by periodically altering the relative speeds of two drive wheels. There is also provided a slippage recovery mode where the drive wheels shut down or greatly slow when severe slippage is sensed, followed by a slow ramp up of speed.

9 Claims, 10 Drawing Sheets

U.S. PATENT DOCUMENTS

| | | |
|---|---|---|
| 6,138,063 A * | 10/2000 | Himeda .................. 701/23 |
| 6,199,610 B1 | 3/2001 | Yanagawa |
| 6,301,738 B1 | 10/2001 | Deiterman et al. |
| 6,338,013 B1 | 1/2002 | Ruffner |
| 6,453,223 B1 | 9/2002 | Kelly et al. |
| 6,481,515 B1 | 11/2002 | Kirkpatrick et al. |
| 6,548,982 B1 | 4/2003 | Papanikolopoulos et al. |
| 6,611,738 B2 | 8/2003 | Ruffner |
| 6,633,150 B1 * | 10/2003 | Wallach et al. ........ 318/568.12 |
| 6,741,054 B2 | 5/2004 | Koselka et al. |
| 2003/0025472 A1 | 2/2003 | Jones et al. |
| 2003/0102014 A1 | 6/2003 | Junji |
| 2003/0120389 A1 | 6/2003 | Abramson et al. |
| 2004/0204792 A1 | 10/2004 | Taylor et al. |
| 2006/0184293 A1 * | 8/2006 | Konandreas et al. .......... 701/23 |
| 2006/0238156 A1 * | 10/2006 | Kim ................ 318/568.12 |
| 2006/0293809 A1 * | 12/2006 | Harwig et al. ............. 701/23 |
| 2007/0262884 A1 * | 11/2007 | Goncalves et al. .... 340/995.24 |
| 2007/0290828 A1 * | 12/2007 | Choi et al. ............. 340/463 |

FOREIGN PATENT DOCUMENTS

| | | | |
|---|---|---|---|
| DE | 19521358 C1 | * | 9/1996 |
| GB | 2352486 B | * | 9/2003 |
| JP | 05250032 A | * | 9/1993 |
| JP | 09145392 A | * | 6/1997 |
| JP | 2001315674 A | * | 11/2001 |
| JP | 3395874 B2 | * | 4/2003 |
| JP | 2005141636 A | * | 6/2005 |
| KR | 2006032333 A | * | 4/2006 |
| KR | 619750 B1 | * | 9/2006 |
| WO | WO 0038029 A1 | | 6/2000 |

* cited by examiner

METHODS TO PREVENT WHEEL SLIP IN AN AUTONOMOUS FLOOR CLEANER

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

It is desirable to minimize the amount of human labor expended in maintaining and cleaning buildings. The art has therefore developed autonomous robotic devices that can clean or otherwise maintain or treat hard floors, carpeting and similar surfaces without the necessity for a human to be present during the operation of the device.

In some such devices a liquid is applied to the flooring area being treated. For example, U.S. Pat. No. 5,279,672 discloses a robotic cleaning apparatus where a cleaning solution is dispensed to the floor by a scrub deck. In U.S. Pat. No. 6,741,054 there is disclosed an autonomous floor mopping apparatus where cleaning fluid is applied to the floor by way of a pre-moistened towel.

Such robotic devices typically have a programmable controller for directing the device in a preferred movement pattern. This helps insure coverage of the full area to be treated, as well as helping to insure that obstacles (e.g. furniture legs) and undesired contact points (e.g. stairways) are avoided. The controllers are typically linked to motors that drive the wheels of the device on the floor.

While devices of this type can work quite well on dry surfaces, the wheels of such devices may slip when traveling over areas of the floor that are wet from the fluid being applied. This is particularly likely when the liquid itself is of the type which, when wet, is significantly more slippery than water (e.g. contains oil for polishing purposes). Such slipping can cause the device to remain in place for an extended period, or more likely cause the device to divert in an unexpected direction from the optimal desired path. This can extend the time needed to treat the surface, and/or can lead to portions of the surface not being adequately treated.

In some robotic devices, a third wheel that is not driven by a motor is used to monitor the movement of the robot. This third wheel has an optical or mechanical sensor (encoder) that will send a digital signal to the controller as long as the robot is moving. Hence, if the robot is in a moving mode, but this third wheel does not sense movement, then the controller knows it is slipping. This method detects slip. This third wheel may be called a stator wheel.

In connection with automobile and truck tires there has been substantial work on trying to improve the traction of the tires through the use of varied tread patterns. However, many of these approaches are designed to take advantage of the very heavy weight of such vehicles, and are not easily transferred to environments where a cleaning robot is involved that weighs much less. Others of these approaches rely on expensive materials, or structures that are relatively expensive to create.

Similarly, in connection with automobiles and trucks, there have been attempts to provide improved anti-slip control by monitoring wheel movement and automatically altering power to the wheels when sensing such slip. Because such controller systems were designed for extremely heavy vehicles, they were not easily transferred to environments where a cleaning robot was involved that weighed much less. Further, some systems that could be transferred to a small cleaning robot were of too great a cost to be used in that environment as a practical matter.

Hence, a need still exists for improved structures and systems for addressing wheel slip concerns in the context of an autonomous floor cleaner.

BRIEF SUMMARY OF THE INVENTION

The invention addresses the foregoing needs by modifying the wheel structure to provide radial transverse recesses of substantial depth between gear-like teeth, by providing a side-to-side wave pattern for forward motion of the device, and/or by providing a reset and ramp up mode once severe wheel slippage is sensed.

During a wet treating operation, a thin film of fluid (e.g. cleaning fluid) is deposited on the floor surface. The maximum layer thickness is controlled so as not to be greater than the depth of radial transverse channels on the wheel. This can be achieved by first applying the liquid to an application cloth, and then controlling the amount of liquid on the cloth and the speed of take-up of the cloth relative to device movement. It can also be achieved by directly applying liquid to the floor, but in a manner where the amount of liquid dispensed is limited based on the area that the device passes over.

In connection with such a tread design, it is desirable to make the contact area of the tire as small as possible, so that more of the weight of the device is borne in a small area of contact. This helps drive the contact surface down through any pooling liquid. A preferred way to achieve this is to form the tire in a sprocket shape with the radial edges of the sprocket being very small rectangular areas. Such a structure also has advantages for gripping a carpet.

A particularly preferred form of wheel can be molded from a thermoplastic elastomer. Such materials are particularly suitable for inexpensive injection molding.

Applying this approach to the invention, there is provided a robotic device for treating (e.g. preferably cleaning) a surface wherein the robotic device includes means for reducing the incidence of wheel slip. The robotic device has a wheel having a tread which has sprocket teeth separated by a radially extending peripheral groove. The peripheral grooves are of a depth exceeding 0.15 cm. The sprocket teeth are suitable to contact the surface being treated.

The robotic device has a housing supported by the wheel, and means for delivering a layer of fluid onto the surface. The robotic device also has a controller in communication with the means for delivering a fluid. The controller provides fluid delivery signals to the means for delivering a fluid such that the layer of fluid can be provided on the surface being treated having a thickness not exceeding the peripheral groove depth.

In another aspect the invention provides a robotic floor treater that delivers a liquid to the floor. The treater has a navigation pattern comprising a side-to-side wave pattern. This is preferably achieved by periodically changing the wheel speed of at least one wheel, and preferably of at least two wheels. The device can be designed, when it is moving forward, to move a short distance (e.g. 1 cm) to the right, followed by movement a short distance to the left. The cycle is repeated continuously. Alternatively, the wave pattern can be initiated only after a certain degree of slippage is sensed.

Adopting such a wave pattern has been surprisingly found to reduce the incidence of wheel slippage, and/or help the device recover from slippage once it occurs. Because the side-to-side movements are so small, this can be achieved with disrupting the ability of the device to essentially move linearly (e.g. along a wall).

In yet another aspect an autonomous robotic device has a first wheel driven by a first motor, a second wheel driven by a second motor, and a housing supported by the wheels. The robotic device further includes means for measuring wheel rotation for the first wheel and the second wheel.

In one preferred form the means for measuring wheel rotation is an encoder. The controller receives first wheel rotation signals associated with the first wheel and second wheel rotation signals associated with the second wheel from the means for measuring wheel rotation. The controller outputs first speed signals to the first motor for driving the first wheel and second speed signals to the second motor for driving the second wheel. The controller executes a stored program to calculate a first amount of slip for the first wheel from the first wheel rotation signals received from the means for measuring wheel rotation and calculate a second amount of slip for the second wheel from the second wheel rotation signals received from the means for measuring wheel rotation.

When the first amount of slip exceeds a predetermined first value of slip or the second amount of slip exceeds a predetermined second value of slip, the controller provides first speed signals to the first motor and/or provides second speed signals to the second motor such that the device navigates in a side-to-side wavy pattern. This can be achieved by varying relative wheel speed between the left wheel and the right wheel in a periodic fashion.

In still another embodiment such a robotic device for treating a floor has a software routine that works in conjunction with speed signals from the wheels of the autonomous floor cleaner to reduce the speed of the wheels (e.g. stop the wheels) in the situation where the wheels are slipping too much on a wet surface. Once the anti-slip routine is implemented and the wheels have either stopped or greatly slowed, the routine will cause the wheel speed to ramp up in a slow manner. This allows the machine to try to recover at a slow speed, rather than just spinning slipping wheels at a slow speed.

The nature of the ramp up may be affected by the cleanliness of the floor or the amount of liquid used. Hence, the machine may be programmed to ramp up more slowly when a high level of liquid is known to be present. Further, in such a situation the device can go to a dead stop before ramping up, rather than merely a slowed speed.

This latter software system may be particularly effective when the liquid being applied is formulated for quick evaporation. By stopping the device one gives an opportunity for some of the liquid causing the slippage to evaporate.

It should be noted that the above tread designs, wave patterns, and ramp up recovery software not only provide anti-slip assistance for wet floors, they are of assistance when the floors are slippery due to the presence of sand or other similar solid material.

In still another aspect the invention provides a robotic device for treating a surface wherein the robotic device includes a first wheel driven by a first motor, a second wheel driven by a second motor, and a housing supported by the first wheel and the second wheel. The robotic device further includes an encoder for measuring wheel rotation for the first wheel and the second wheel. The robotic device has a controller in communication with the first motor, the second motor, and the means for measuring wheel rotation. The controller receives first wheel rotation signals associated with the first wheel and second wheel rotation signals associated with the second wheel from the means for measuring wheel rotation. The controller also provides first speed signals to the first motor for driving the first wheel and second speed signals to the second motor for driving the second wheel.

During operation of the robotic device, the controller executes a stored program to calculate a first amount of slip for the first wheel from the first wheel rotation signals received from the means for measuring wheel rotation and calculate a second amount of slip for the second wheel from the second wheel rotation signals received from the means for measuring wheel rotation. The controller then provides first speed signals to the first motor that slow or stop the first wheel if the first amount of slip exceeds a predetermined first value of slip. The controller may also provide further first speed signals to the first motor that increases speed of the first wheel if the first wheel has been slowed or stopped because the first amount of slip has exceeded the predetermined first value of slip.

In still another aspect, the invention provides a robotic device for treating a surface wherein the robotic device includes means for reducing and/or preventing wheel slip. The robotic device has a first wheel driven by a first motor, a second wheel driven by a second motor, and a housing supported by the first wheel and the second wheel. The robotic device further includes means for measuring wheel rotation for the first wheel and the second wheel such as an encoder. The robotic device also includes a controller in communication with the first motor, the second motor, and the means for measuring wheel rotation. The controller receives first wheel rotation signals associated with the first wheel and second wheel rotation signals associated with the second wheel from the means for measuring wheel rotation. The controller provides first speed signals to the first motor for driving the first wheel and second speed signals to the second motor for driving the second wheel.

During operation of the robotic device, the controller executes a stored program to calculate a first amount of slip for the first wheel from the first wheel rotation signals received from the means for measuring wheel rotation, and calculate a second amount of slip for the second wheel from the second wheel rotation signals received from the means for measuring wheel rotation. The controller provides first speed signals to the first motor that cyclically decreases and increases speed of the first wheel if the first amount of slip has exceeded the predetermined first value of slip, and provides second speed signals to the second motor that cyclically decreases and increases speed of the second wheel if the second amount of slip has exceeded the predetermined second value of slip.

In yet another aspect the invention provides a robotic device for treating a surface wherein the robotic device includes means for reducing and/or preventing wheel slip. The robotic device includes a first wheel driven by a first motor, a second wheel driven by a second motor, and a housing supported by the first wheel and the second wheel. The robotic device has means for delivering a fluid onto the surface, and means for measuring wheel rotation for the first wheel and the second wheel. The robotic device also has a controller in communication with the first motor, the second motor, the means for delivering a fluid, and the means for measuring wheel rotation.

The controller receives first wheel rotation signals associated with the first wheel and second wheel rotation signals associated with the second wheel from the means for measuring wheel rotation. The controller provides first speed signals to the first motor for driving the first wheel and second speed signals to the second motor for driving the second wheel. The controller also provides fluid delivery signals to the means for delivering a fluid.

During operation of the robotic device the controller executes a stored program to calculate a first amount of slip for the first wheel from the first wheel rotation signals received from the means for measuring wheel rotation, and calculate a second amount of slip for the second wheel from the second wheel rotation signals received from the means for measuring wheel rotation. When the first amount of slip exceeds a predetermined first value of slip or the second amount of slip exceeds a predetermined second value of slip, the controller provides fluid delivery signals to the means for delivering a fluid such that fluid is not delivered onto the surface. In this manner, the device can temporarily stop applying liquid floor cleaner until wheel slip subsides.

In still another aspect, the invention provides a robotic device for treating a surface wherein the robotic device includes means for reducing and/or preventing wheel slip. The robotic device includes a first wheel driven by a first motor, a second wheel driven by a second motor, and a housing supported by the first wheel and the second wheel. The robotic device has a sheet cleaning material disposed on the device, and means for delivering a fluid onto the sheet cleaning material. The robotic device also has means for measuring wheel rotation for the first wheel and the second wheel.

A controller of the robotic device is in communication with the first motor, the second motor, the means for delivering a fluid, and the means for measuring wheel rotation. The controller receives first wheel rotation signals associated with the first wheel and second wheel rotation signals associated with the second wheel from the means for measuring wheel rotation. The controller provides first speed signals to the first motor for driving the first wheel and second speed signals to the second motor for driving the second wheel. The controller also provides fluid delivery signals to the means for delivering a fluid.

During operation of the robotic device, the controller executes a stored program to calculate a first amount of slip for the first wheel from the first wheel rotation signals received from the means for measuring wheel rotation, and calculate a second amount of slip for the second wheel from the second wheel rotation signals received from the means for measuring wheel rotation. When the first amount of slip exceeds a predetermined first value of slip or the second amount of slip exceeds a predetermined second value of slip, the controller provides fluid delivery signals to the means for delivering a fluid such that fluid is not delivered onto the sheet cleaning material. In this manner, the device can temporarily stop applying liquid floor cleaner until wheel slip subsides.

Hence, a robotic device with improved anti-slip control is provided. The foregoing and other advantages of the invention will become apparent from the following description. In the following description reference is made to the accompanying drawing which forms a part thereof, and in which there is shown by way of illustration preferred embodiments of the invention. These embodiments do not represent the full scope of the invention. Reference should therefore be made to the claims herein for interpreting the scope of the invention.

DETAILED DESCRIPTION OF THE PREFERRED EMBODIMENTS

We first describe example autonomous cleaning devices with reference to FIGS. 1-11. This provides examples of environments where the invention of the present invention can be applied. Thereafter, we describe with reference to FIGS. 12-15 specific features of the present invention.

It should be understood that the present invention is also suitable for use with many other types of autonomous treating devices. Thus, the invention is not intended to be restricted to just cleaning devices, much less devices having the specific attributes shown in FIGS. 1-11.

Figure 1:
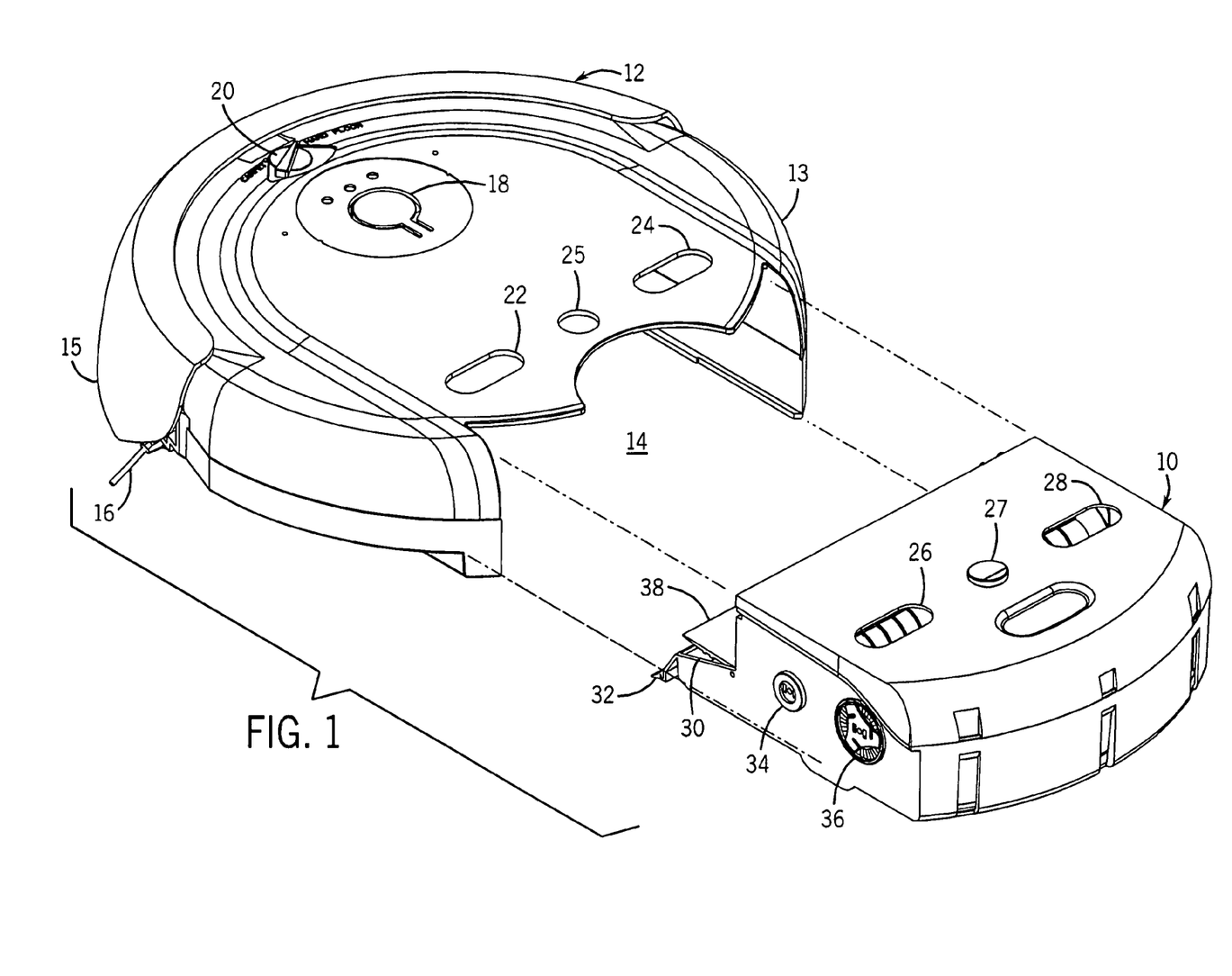
FIG. 1 is an exploded rear perspective view of an autonomous robotic surface treating device of the present invention.
Figure 3:
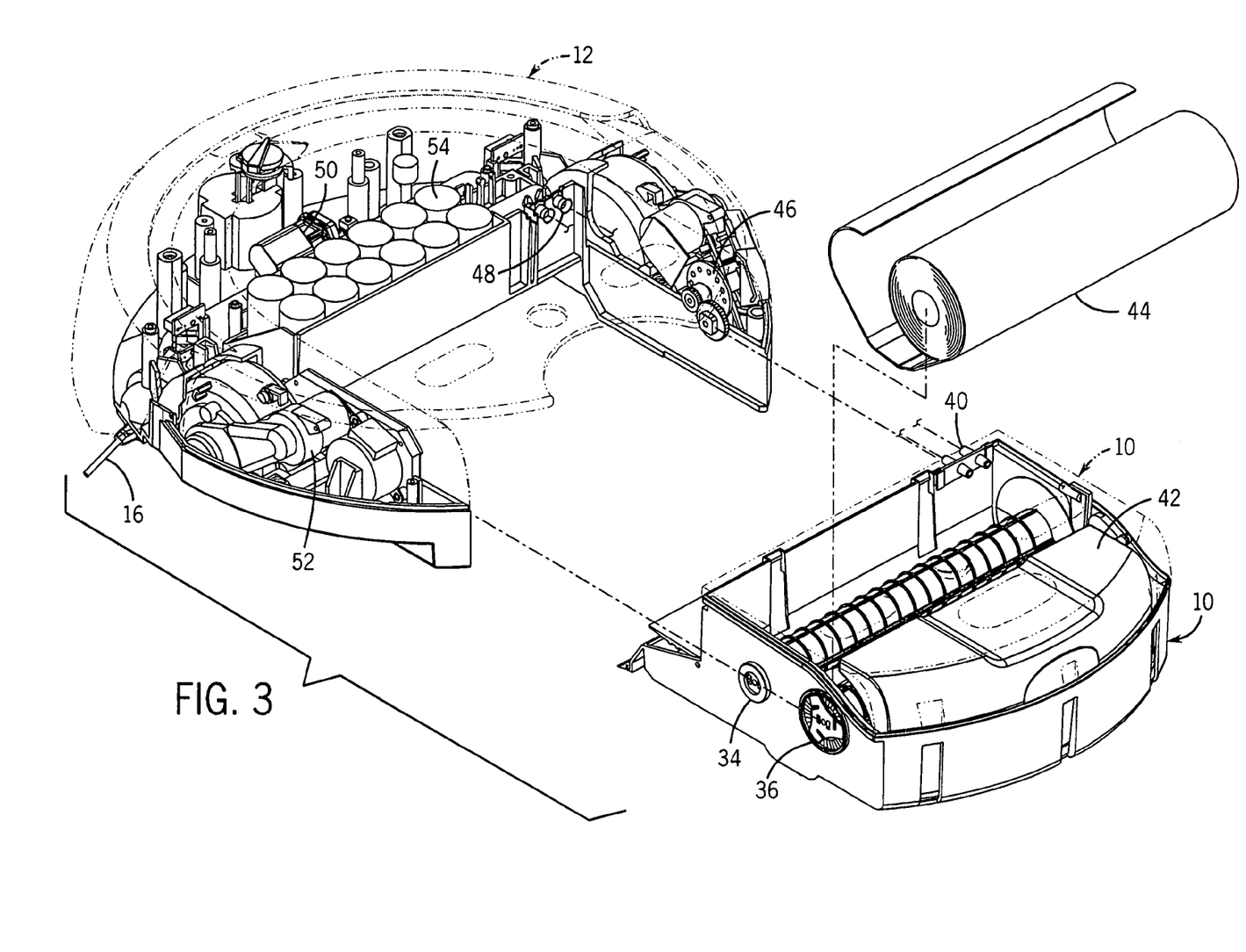
FIG. 3 is a view similar to FIG. 1, but with upper housings removed.

Referring particularly to FIGS. 1 and 3, there is a cleaning cartridge 10 suitable to be inserted into a cleaning device 12. The cleaning cartridge 10 has a roll of sheet cleaning material 44 which is provided in a reel-to-reel configuration. A portion of the roll is maintained in contact with the surface below the cleaning device 12 at any given time during operation. A motor 52 is provided in the cleaning device 12 to consistently index the cleaning sheet material, so as to maintain a relatively fresh sheet against the floor.

Figure 2:
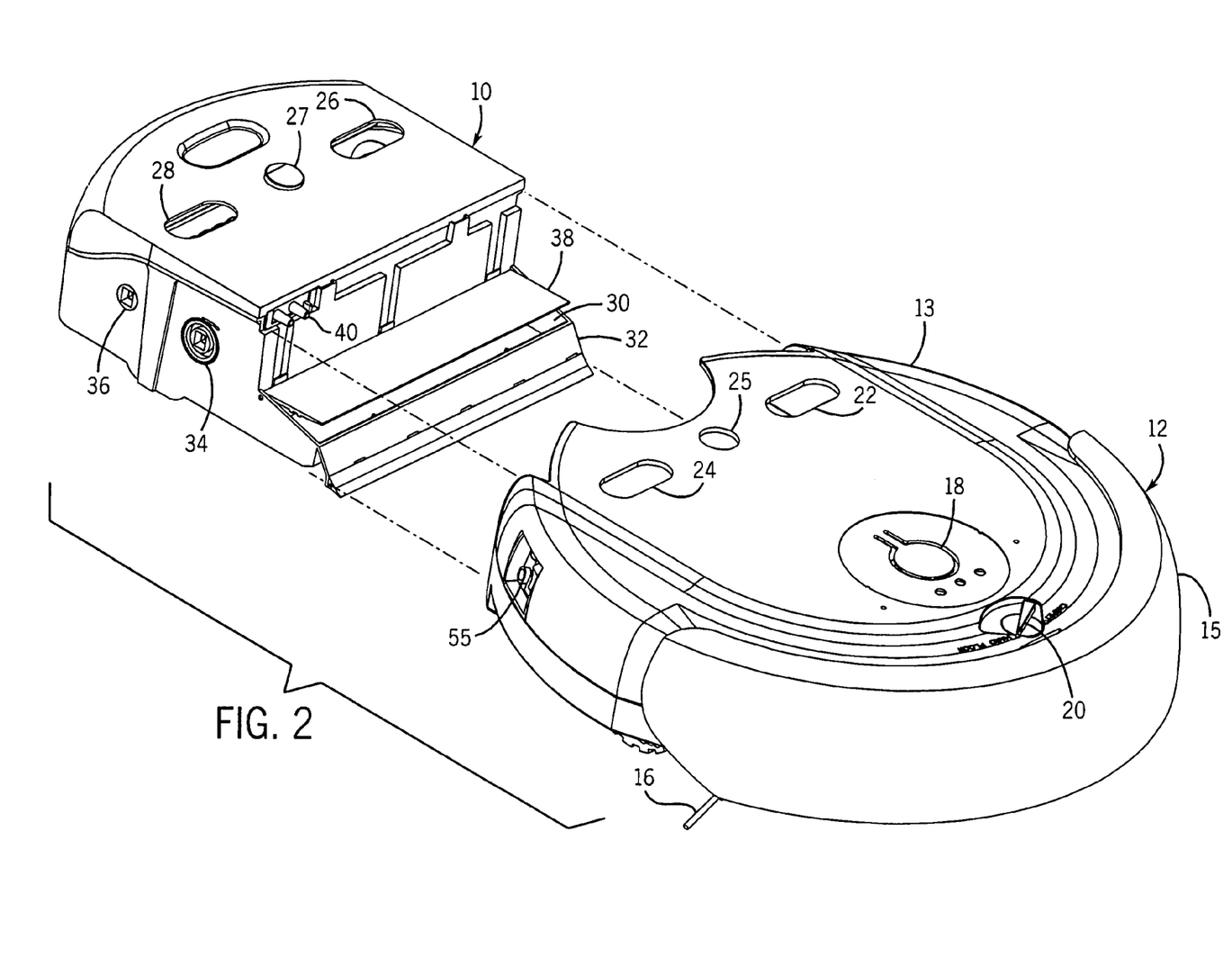
FIG. 2 is an exploded frontal perspective view of the device of FIG. 1.
Figure 4:
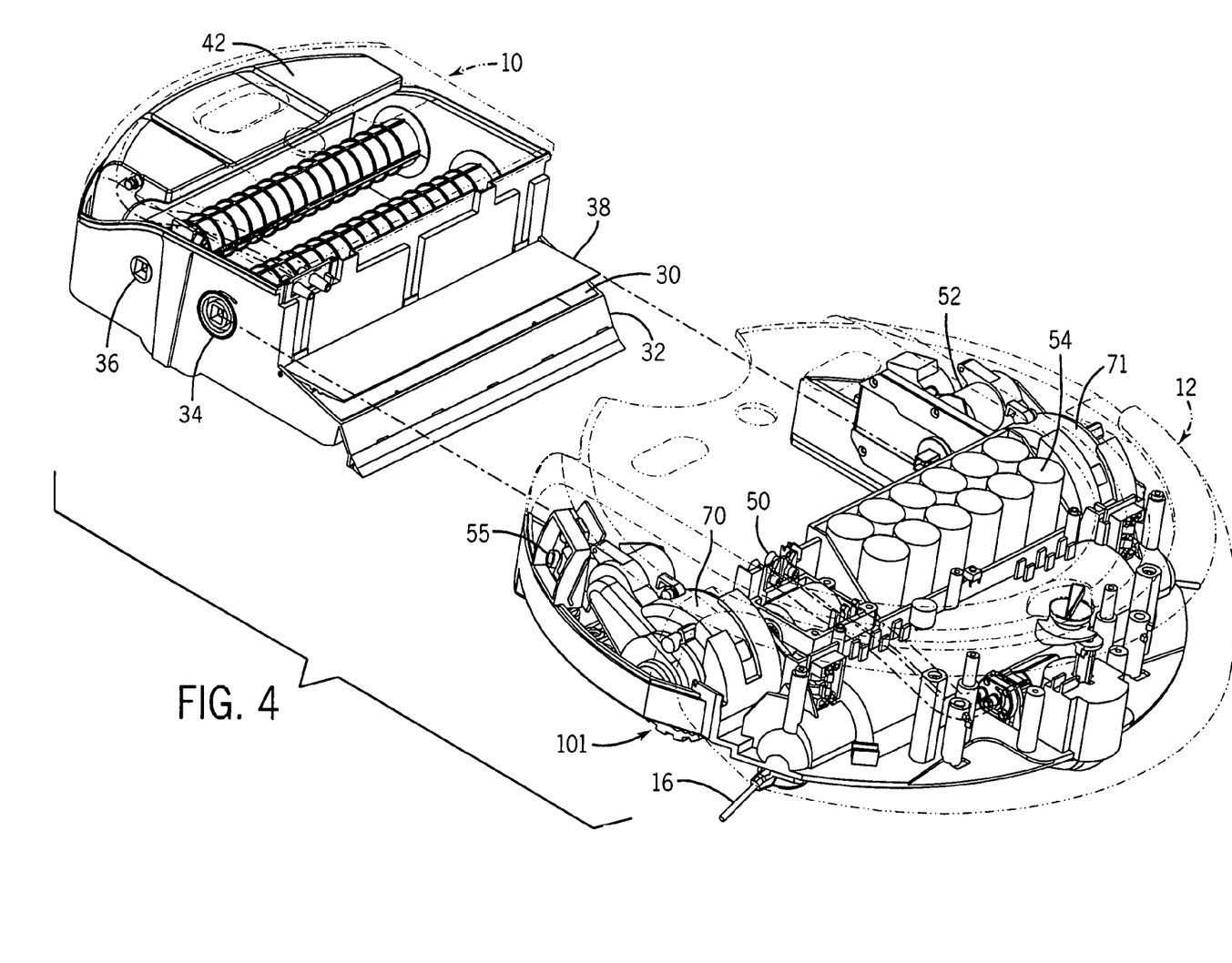
FIG. 4 is a view similar to FIG. 2, but with upper housings removed.
Figure 5:
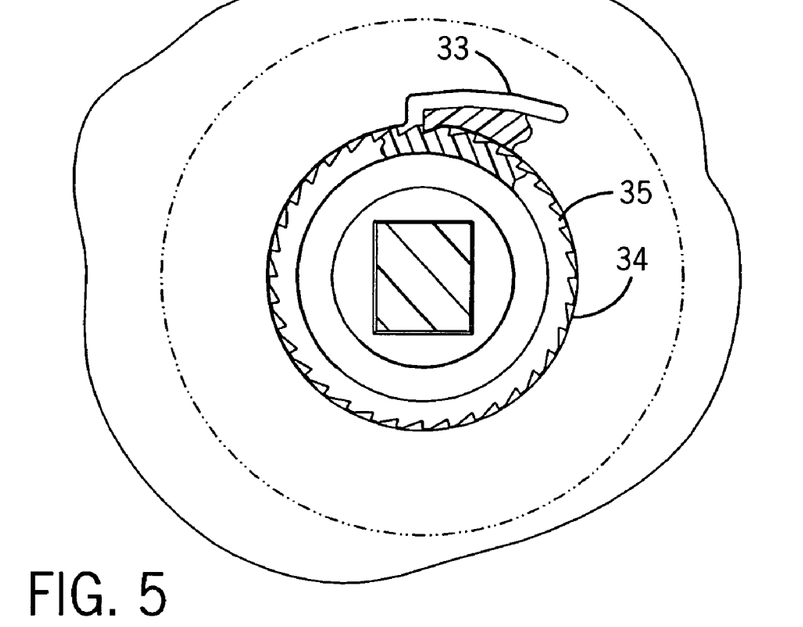
FIG. 5 is a schematic view illustrating how a take-up reel of the assembly is ratcheted for one-way motion.
Figure 6:
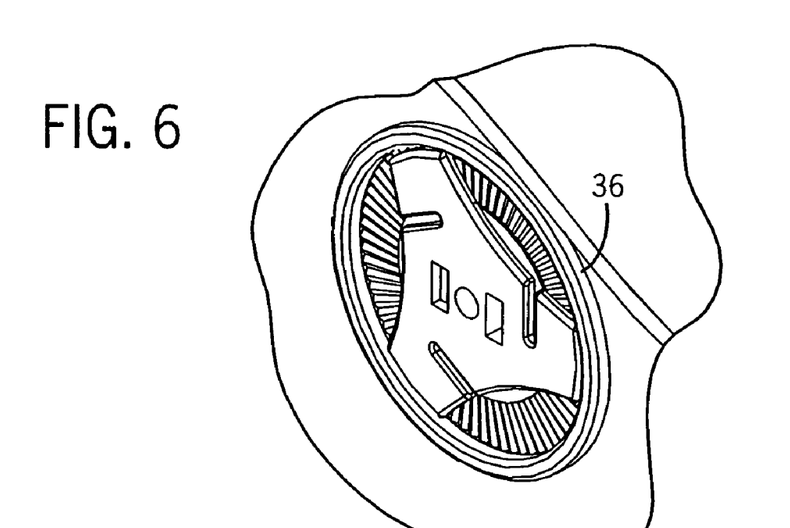
FIG. 6 is an enlarged perspective view of an end of a supply reel of the present assembly.
Figure 7:
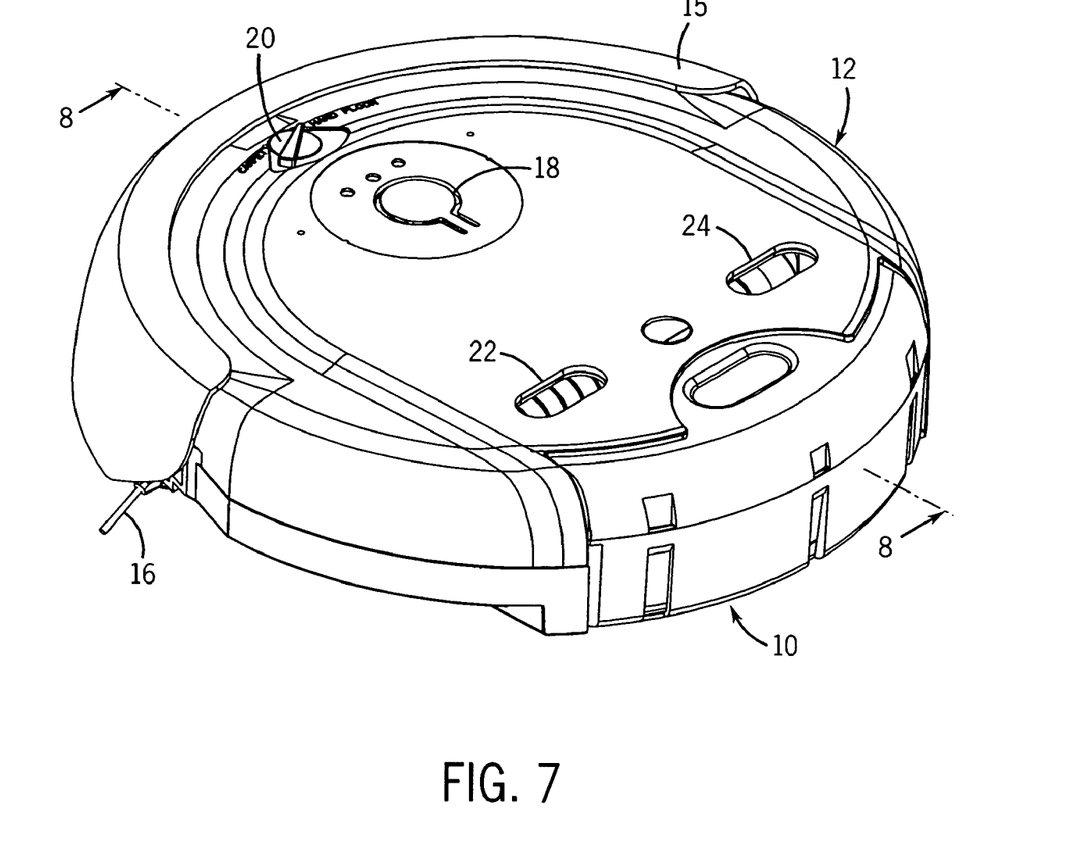
FIG. 7 is a view similar to FIG. 1, but showing the device in fully assembled form.

Referring now also to FIGS. FIGS. 2 and 4, the cleaning device 12 is in the form of an autonomous robot which includes a housing 13 having an aperture 14 sized and dimensioned to receive the cleaning cartridge 10. In the housing 13 and located above the aperture 14 are two windows 22 and 24 which allow the user to view the cleaning cartridge 10, and the roll of cleaning sheet material 44 maintained therein.

Figures 8, 9:
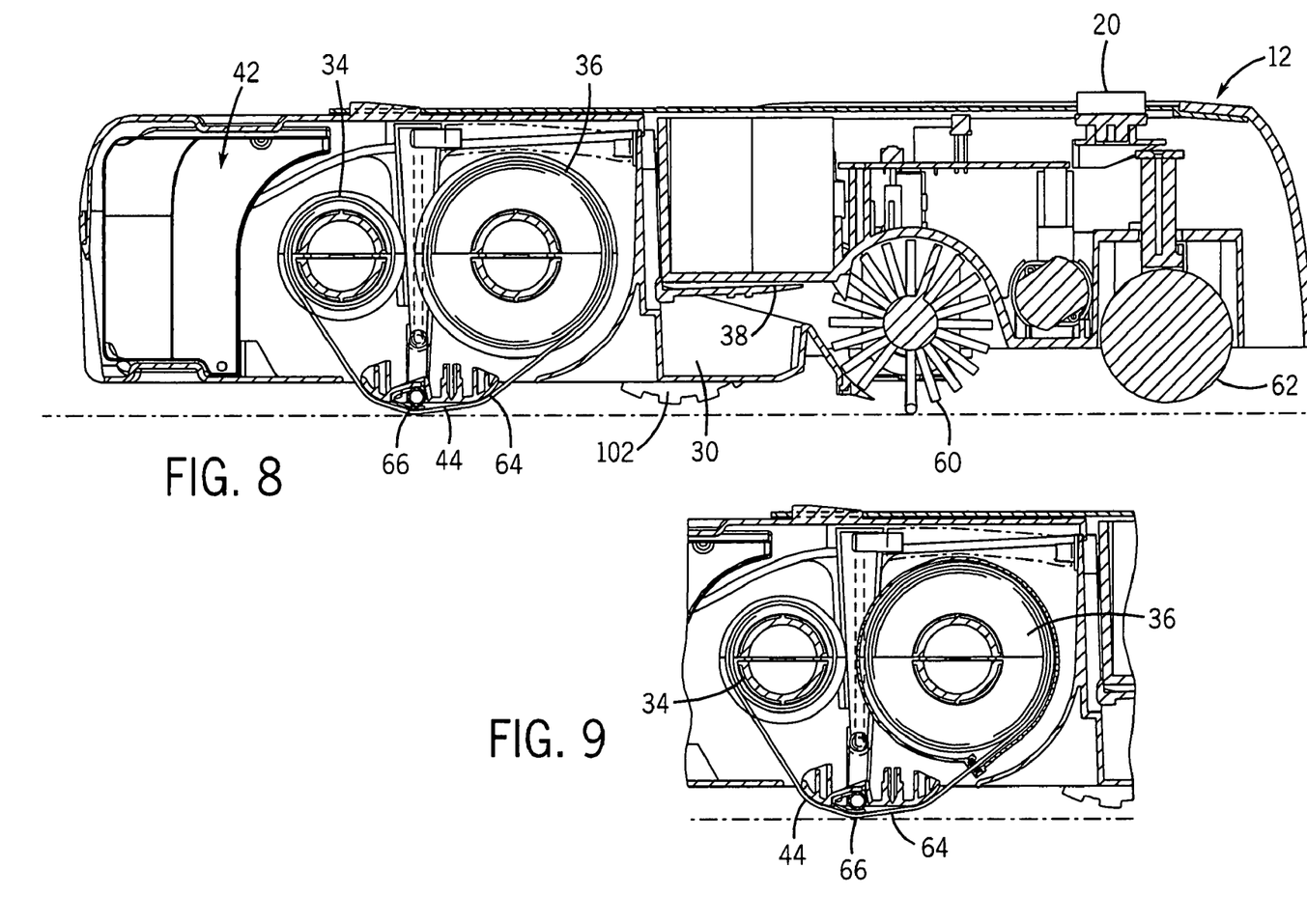
FIG. 8 is a sectional view taken along line 8-8 of FIG. 7.
FIG. 9 is an enlarged view of the reel-to-reel portion of the present device, highlighting a portion of the FIG. 8 drawing.

An aperture 25 is also provided which, in conjunction with a latching device 27 on the cartridge 10, provides a latch for selectively connecting the cartridge 10 to the cleaning device 12. The cleaning device 12 also includes a bumper 15 at a front end and side brushes 16. As shown in FIG. 8, the cleaning device 12 also includes a sweeper brush 60 for cleaning large particulate matter. The cleaning sheet material 44 follows the brush 60 and typically cleans smaller particulate matter such as hair and dust which have not been picked up through the use of the brush 60.

The cartridge 10 includes windows 26 and 28 which, when positioned in the cleaning device 12, are aligned with the windows 22 and 24 in the housing 13 of the cleaning device 12, thereby allowing a user visual access to the cleaning sheet material 44 within the cartridge 10. A dust bin 30 is provided in the cleaning cartridge 10 at the end of the cartridge which is received inside of the housing 13 of the cleaning device 12.

The dust bin 30 is designed to be positioned adjacent the brush 60 (FIG. 8) in the cleaning device 12. It is selectively covered by a hinged lid 38, which is forced open as the cleaning cartridge 10 is moved into the cleaning device 12 but which swings shut and is therefore normally closed when the cartridge is removed from the cleaning device 12, thereby retaining dust collected by the cleaning device 12 within the dust bin 30 for cleaning, replacement, or disposal of the cartridge 10.

A flexible blade 32 is provided in front of the dust bin 30, directed from an upper edge of the dust bin 30 to the surface below the cartridge 10. The flexible blade 32 directs dirt collected by the brush 60 of the cleaning device 12 into the dust bin 30.

The reel-to-reel device provided in the cartridge 10 includes both a take-up reel 34, to which used cleaning sheet material 44 is directed, and a supply reel 36, to which an unused roll of cleaning sheet material is connected and from which the cleaning process is supplied. The take-up reel 34 (FIG. 5) is ratcheted in order to prevent used cleaning sheet material 44 from being directed back over the surface to be cleaned, while the supply reel 36 (FIG. 6) provides a resistive force limiting rolling of the sheet unless driven by the stepper motor 52. Teeth 35 in the take-up reel 34 are engaged with spring-loaded teeth 33 to ratchet the reel and limit motion.

The cleaning sheet material 44 can comprise, for example, an electrostatic or electret material. Examples of such materials are those described in WO 02/00819. The cleaning sheet material 44 can also provide a liquid treating or dispensation function. For example, the cleaning cloth can be treated with cleaning fluid or polishes to treat the floor with surfactants, insecticides, insect repellants, and/or fragrances.

The cartridge 10 can further comprise a fluid reservoir 42 for providing a fluid to the cleaning sheet material 44 during operation. The fluid supply provided in the reservoir 42 is connected to a pump 50 provided in the cleaning device 12 through fluid inlets 40 provided on the cartridge 10 and fluid outlets 48 provided on the cleaning device 12. In operation, therefore, the control of fluid flow to the cleaning sheet material 44 is controlled by the cleaning device 12, and is provided to the sheet material to maintain a selected level of moisture over the life of the cartridge.

A bank of batteries 54 provides power to the cleaning device, which is selectively activated by a switch 18 (FIG. 1) provided on the cleaning device 12. The batteries are preferably rechargeable, and are accessed through a port 55 provided in the side of the housing of the cleaning device 12 (FIG. 2)

The cloth supply reel 36 is driven by the stepper motor 52 provided in the cleaning device and the amount of the roll of the sheet material 44 which is unwound during operation is monitored by an optical sensor 46, which is also provided in the cleaning device 12. The stepper motor 52, optical sensor 46, and pump 50 are each driven by a programmable controller (not shown, but positioned above the battery pack) based on timing which drives the stepper motor to replace the sheet material as necessary to maintain proper cleaning processes during a cleaning operation while monitoring actual movement of the sheet.

Similarly, the controller drives the pump 50 to supply fluid to the roll of sheet material 44 as necessary during cleaning. The timing for replenishment of the fluid source is based on the type of material and fluid being employed, and in the expected life of the roll of cleaning sheet material 44. The controller preferably maintains the cleaning sheet material 44 in a constant tension, and, while in use, indexes at a predetermined rate, as for example, 0.75 inches per 5 minutes or thereabout, over the life of the cartridge. The stepper motor 52 is coupled to the take-up reel 34 through a series of gears, while the supply reel is coupled to the optical sensor which detects the amount of rotation of the supply wheel.

Referring now to FIGS. 8 and 9, the cleaning device 12 includes a beater or sweeping brush 60. A wheel 62 at the front of the cleaning device 12 is adjustable by activation of a switch 20 between at least two positions, one selected for use with a carpet, and another for use with a hard floor surface. As the cartridge 10 is inserted into the robot 12 the flexible blade 32 is positioned adjacent the main brush 60 and receives the relatively large particulate matter collected by the brush as the cleaning device 12 is run across a floor surface. The particulates are directed up the flexible blade 32 by the main brush 60 and into the dust containment bin 30.

In operation the hinged lid 38 is retained in an open position such that the dust and particulate matter can be readily directed into the containment bin 30. Following behind the main brush 60 is the cartridge 10 including the cleaning sheet material 44. The cleaning sheet material 44 is retained against the surface to be cleaned by a platen 66 which includes a leaf-spring 64 that insures contact between the surface to be cleaned and the cleaning cloth 44. Also as described above, the reservoir 42 is provided adjacent the cleaning material 44 such that fluids can be applied to replenish the cloth when a wet or moist mop cloth is employed in the cleaning device 12.

Figure 10:
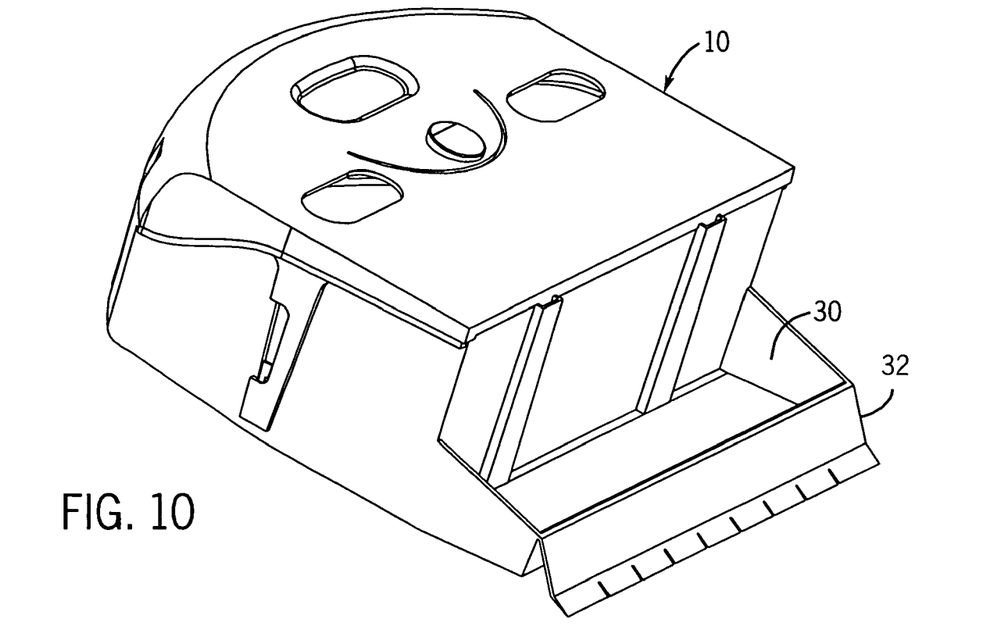
FIG. 10 is a front, left, upper perspective view of an alternative cartridge useful with the FIG. 1 device, when cleaning carpeting.
Figure 11:
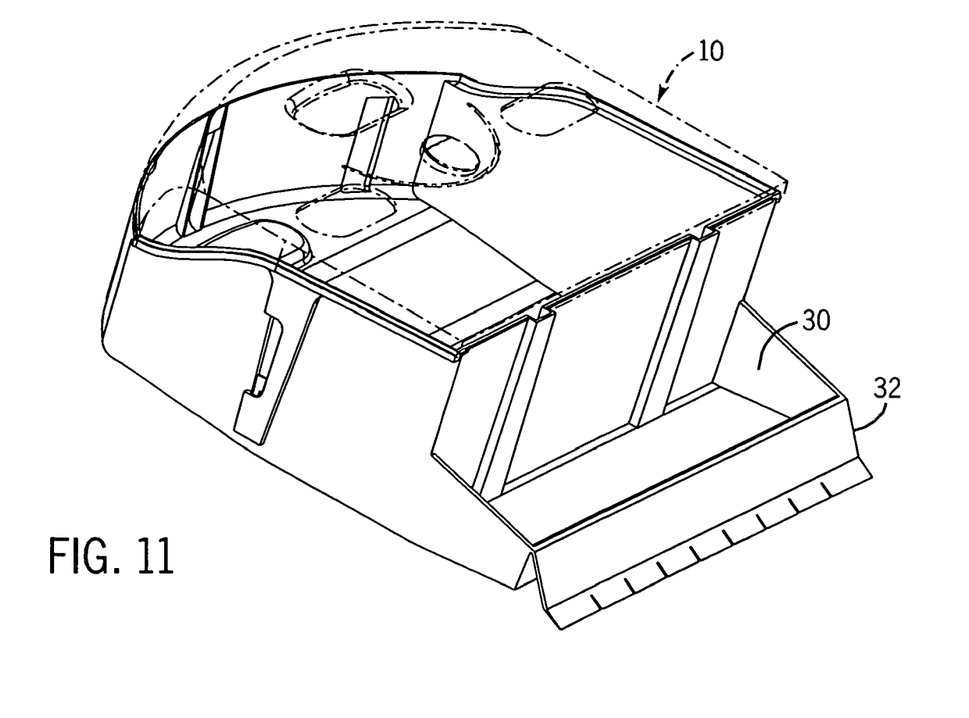
FIG. 11 is a view similar to FIG. 10, but with an upper cover removed.

Although a cleaning sheet material 44 has been shown and described particularly designed for use on a hard, smooth floor, a cartridge 10 for use with a carpet is shown in FIGS. 10 and 11. Here, the cartridge comprises a larger dust containment bin 30, and is weighted appropriately to maintain the cleaning device 12 against the surface to be cleaned, and in an upright position during the cleaning operation.

The cartridge 10 preferably is a replaceable element that can be thrown away as a unit when the sheet material is used up, the fluid in the fluid reservoir 42 is spent, or the dust bin is full. Furthermore, even before the cleaning material is spent, the cartridge 10 can be removed and the dust bin 30 emptied by the user with minimal dust dispersion.

In an alternative embodiment (not shown), the fluid reservoir 42 can deliver fluid directly to the floor during operation. The fluid supply provided in the reservoir 42 is connected to the pump 50 provided in the cleaning device 12 through fluid inlets 40 provided on the cartridge 10 and fluid outlets 48 provided on the cleaning device 12. The controller drives the pump 50 to supply fluid to the floor as necessary during cleaning.

Turning now to key features of the present invention, the cleaning device 12 includes motors 70 and 71 for driving the left wheel 101 and the right wheel 102 of the cleaning device 12, respectively. The motors 70, 71 are each controlled by the programmable controller which includes a microprocessor under the control of a software program stored in a memory. Among other things, the controller provides voltage signals to the motors 70 and 71 that cause the left wheel 101 and the right wheel 102 to start, stop, rotate in a direction causing forward motion of the cleaning device 12, rotate in a direction causing reverse motion of the cleaning device 12, and rotate at increased or decreased speeds.

An encoder is associated with each wheel 101,102 and is connected to the controller. Encoders are commercially available and in one version, the encoder outputs a signal having a pulse every time each wheel 101,102 rotates a predetermined angle. For example, an optical encoder outputs pulses each time an optical beam is broken by an element that rotates with the wheel. The controller respectively calculates the wheel speed of each wheel 101,102 based upon an interval between pulses outputted from each encoder. Changes in the interval between pulses can also be used by the controller to calculate wheel acceleration.

Among other things, the controller can use calculated wheel speeds to control motion of the left wheel 101 and the right wheel 102. In one example algorithm, the controller provides a positive voltage in the range of 0 to +10 volts to each motor 70 and 71 to drive the left wheel 101 and the right wheel 102 in forward motion. The controller uses calculated wheel speeds to determine the amount of voltage to be applied the motors 70 and 71 to control motion of the left wheel 101 and the right wheel 102. Voltage controls the motor speed as voltage will typically be proportional to motor speed. The controller provides a negative voltage in the range of 0 to −10 volts to each motor 70 and 71 to drive the left wheel 101 and the right wheel 102 in reverse motion.

Figures 12, 13, 14:
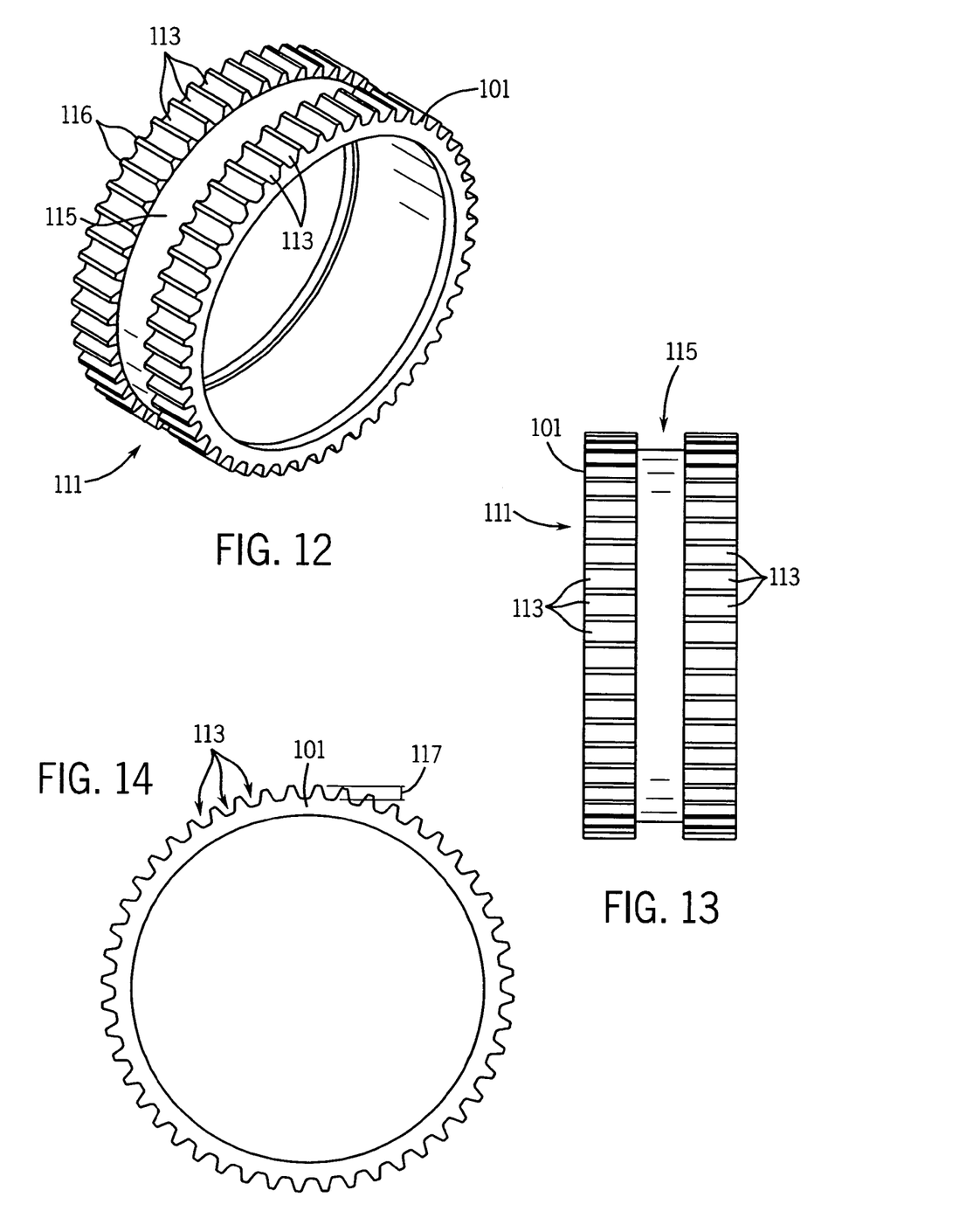
FIG. 12 is a right, front, upper perspective view of a sleeve for a drive wheel for such devices (with wheel hub removed)
FIG. 13 is a front elevational view of the wheel sleeve of FIG. 12.
FIG. 14 is a side elevational view of the wheel sleeve of FIG. 12.

Turning next to focus on FIGS. 12-14, the tread portions of wheels are shown. These could be integral with hubs and thus suitable to link directly to axles connected with the driving motors. Alternatively, these could be separate treads positioned on separate hubs.

In any event, these drawings show tread for a particular left wheel 101, which preferably will be identical to tread for the right wheel 102. The tread of the left wheel 101 has a tread 111 having lateral grooves 113 of depth 117 on each side of the tread 111. A circumferential longitudinal channel 115 extends around the tread 111 between the grooved sections. The entire wheel 101 may be formed from a thermoplastic styrenic material. This material provides good grip as well as chemical resistance. In one form, the radius of the wheel 101 is 31.70 millimeters, the transverse width of the wheel 101 is 23.50 millimeters, the transverse width of the longitudinal channel 115 is 7.7 millimeters, the depth 117 of the lateral grooves is 2.01 millimeters, and the floor contacting surfaces 116 are 1.07 millimeters in the circumferential direction and 7.90 millimeters in the transverse direction.

During a wet cleaning operation of the autonomous floor cleaner 12, a thin film of fluid is deposited on the floor surface by way of direct delivery from the fluid reservoir 42 to the floor surface or by way of the moistened cleaning sheet material 44. Traction is improved by reducing the thickness of the film layer to the point where tire tread and floor surface are able to make contact. In one embodiment, this is achieved as the controller of the cleaning device 12 provides fluid delivery signals to the pump 50 such that the layer of fluid on the floor surface has a thickness less than the depth 117 of the tread grooves 113. In this manner, traction is improved by reducing the thickness of the fluid layer to the point where tire tread and floor surface are able to make contact. Also, the longitudinal channel 115 of the tread 111 channels fluid away to further improve traction of the wheels 101, 102.

There can be an algorithm in the controller for measuring slippage of the left wheel 101 and/or the right wheel 102 of the cleaning device 12, whereby the controller calculates and compares wheel speeds for the left wheel 101 and the right wheel 102. Wheel slipping results when a motor drives its wheel at too high of a speed relative to the other wheels.

Thus, if motor 70 drives the left wheel 101 at too high of a speed relative to the right wheel 102, the controller outputs a variable indicating left wheel slippage. Likewise, if motor 71 drives the right wheel 102 at too high of a speed relative to the left wheel 101, the controller outputs a variable indicating right wheel slippage. The relative difference between left wheel speed and right wheel speed that indicates a wheel slippage condition can be programmed in the controller.

In another example algorithm for measuring slippage of the left wheel 101 and/or the right wheel 102 of the cleaning device 12, an encoder is provided for the wheel 62 at the front of the cleaning device 12. The controller calculates the wheel speed of wheel 62 based upon an interval between pulses outputted from the encoder associated with the wheel 62. Wheel 62 is not driven by a motor and therefore, it provides a good value for the forward or reverse speed of the cleaning device 12. Wheel slipping can be deemed to have resulted if motor 70 drives the left wheel 101 at too high of a speed relative to the wheel 62 or if motor 71 drives the right wheel 102 at too high of a speed relative to the wheel 62. Therefore, the controller outputs variables indicating left wheel slippage or right wheel slippage based on a programmed relative difference between the left wheel speed and the speed of the wheel 62 and the right wheel speed and the speed of the wheel 62.

In still another example algorithm for measuring slippage of the left wheel 101 and/or the right wheel 102 of the cleaning device 12, the relationship between wheel torque and slippage is used to calculate wheel slippage. Typically, under-torque conditions indicate wheel slippage. The torque on the left wheel 101 and the torque on the right wheel 102 may be calculated as a function of current in the wheel motors 70 and 71. Thus, the controller outputs variables indicating left wheel slippage or right wheel slippage based on wheel motor current readings.

Yet another example algorithm for measuring slippage of the left wheel 101 and/or the right wheel 102 of the cleaning device 12 is described in U.S. Pat. No. 6,046,565 which is incorporated herein by reference along with all other patents cited herein.

Having calculated slippage of the left wheel 101 and/or the right wheel 102, the controller executes one of the specified software routines that reduce and/or prevent wheel slip in the autonomous floor cleaner 12. For example, if the software determines that the amount of wheel slip of the left wheel 101 exceeds a predetermined first value of slip (that may be programmed in the controller) or that the amount of wheel slip of the right wheel 102 exceeds a predetermined second value of slip (that may be programmed in the controller), the controller provides speed signals to the motor 70 and provides speed signals to the motor 71 such that the device navigates in a side-to-side wavy pattern. This can be achieved by varying wheel speed between the left wheel 101 and the right wheel 102.

Figure 15:
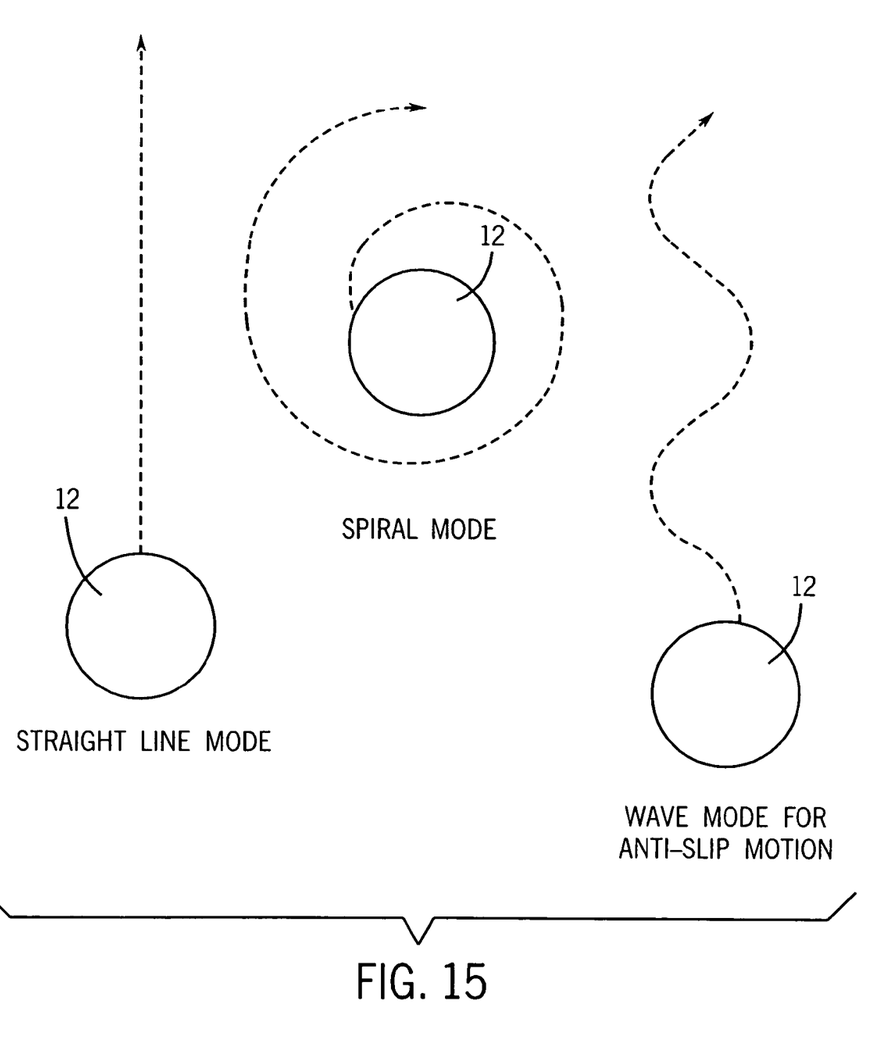
FIG. 15 is a schematic comparison of two prior art modes of travel with a preferred wave mode of travel of the present invention.

For instance, when the speed of the right wheel 102 exceeds the left wheel 101, the cleaning device 12 will veer left, and when the speed of the left wheel 101 exceeds the right wheel 102, the cleaning device 12 will veer right. In FIG. 15, this wave mode for anti-slip motion is shown to the right of a conventional straight line mode and a conventional spiral mode for autonomous robot navigation. It is most preferred that the side-to-side motion be limited to only a few centimeters at most so that the algorithm will work a vertical wall.

Alternatively, if the software determines that the amount of wheel slip of the left wheel 101 exceeds a predetermined first value of slip, the controller provides speed signals to the motor 70 that slow or stop the left wheel 101. The controller may also provide further speed signals to the motor 70 that increase speed of the left wheel 101 after the left wheel 101 has been slowed or stopped. There may be a pause period while the system allows some cleaner to evaporate. In any event, at some point the software slowly ramps up the speed to gain traction.

In yet another software routine, if the software determines that the amount of wheel slip of the left wheel 101 exceeds a predetermined first value of slip, the controller provides speed signals to the motor 70 that cyclically decrease and increase speed of the left wheel 101. If the software determines that the amount of wheel slip of the right wheel 102 exceeds a predetermined second value of slip, the controller provides speed signals to the motor 71 that cyclically decrease and increase speed of the right wheel 102. In this manner, the device can modulate wheel speed until wheel slip subsides.

In yet another software routine, if the software determines that the amount of wheel slip of the left wheel 101 exceeds a predetermined first value of slip or the amount of wheel slip of the right wheel 102 exceeds a predetermined second value of slip, the controller provides fluid delivery signals to the pump 50 such that fluid is not delivered onto the surface. In this manner, the device can temporarily stop applying liquid floor cleaner until wheel slip subsides.

In yet another software routine, if the software determines that the amount of wheel slip of the left wheel 101 exceeds a predetermined first value of slip or the amount of wheel slip of the right wheel 102 exceeds a predetermined second value of slip, the controller provides fluid delivery signals to the pump 50 such that fluid is not delivered onto the sheet cleaning material 44. In this manner, the device can temporarily stop applying liquid floor cleaner until wheel slip subsides.

Although specific embodiments of the present invention have been described in detail, it should be understood that this description is merely for purposes of illustration. Many modifications and variations to the specific embodiments will be apparent to those skilled in the art, which will be within the spirit and scope of the invention. Therefore, the invention should not be limited to the described embodiments. Rather, the claims should be looked to in order to judge the full scope of the invention.

INDUSTRIAL APPLICABILITY

Disclosed are wheel tread configurations, wave mode navigational controlling systems, ramp up recovery systems, and other software for reducing and/or preventing wheel slip in an autonomous floor treater that applies fluid to a surface being treated.

The invention claimed is:

1. A robotic device for treating a surface, comprising:
a first wheel driven by a first motor;
a second wheel driven by a second motor;
a housing supported by the first wheel and the second wheel;
means for measuring wheel rotation for the first wheel and the second wheel; and
a controller in communication with the first motor, the second motor, and the means for measuring wheel rotation, the controller receiving first wheel rotation signals associated with the first wheel from the means for measuring wheel rotation, the controller receiving second wheel rotation signals associated with the second wheel from the means for measuring wheel rotation, the controller providing first speed signals to the first motor for driving the first wheel, the controller providing second speed signals to the second motor for driving the second wheel,
wherein the controller executes a stored program to:
(i) calculate a first amount of slip for the first wheel from the first wheel rotation signals received from the means for measuring wheel rotation,
(ii) calculate a second amount of slip for the second wheel from the second wheel rotation signals received from the means for measuring wheel rotation,
(iii) provide first speed signals to the first motor that slow or stop the first wheel if the first amount of slip exceeds a predetermined first value of slip, and
(iv) provide second speed signals to the second motor that slow or stop the second wheel if the second amount of slip exceeds a predetermined second value of slip.

2. The robotic surface treating device of claim 1, wherein:
the controller executes a stored program to:
(v) provide further first speed signals to the first motor that increases speed of the first wheel if the first wheel has been slowed or stopped because the first amount of slip has exceeded the predetermined first value of slip, and
(vi) provide further second speed signals to the second motor that increases speed of the second wheel if the second wheel has been slowed or stopped because the second amount of slip has exceeded the predetermined second value of slip.

3. The device of claim 2 wherein:
the speed of the first wheel or the speed of the second wheel is increased at a rate dependent on level of a liquid present on the surface.

4. The device of claim 1 wherein:
the first wheel is stopped if the first amount of slip exceeds the predetermined first value of slip, and
the second wheel is stopped if the second amount of slip exceeds the predetermined second value of slip.

5. A robotic device for treating a surface, comprising:
a first wheel driven by a first motor;
a second wheel driven by a second motor;
a housing supported by the first wheel and the second wheel;
means for measuring wheel rotation for the first wheel and the second wheel; and
a controller in communication with the first motor, the second motor, and the means for measuring wheel rotation, the controller receiving first wheel rotation signals associated with the first wheel from the means for measuring wheel rotation, the controller receiving second wheel rotation signals associated with the second wheel from the means for measuring wheel rotation, the controller providing first speed signals to the first motor for driving the first wheel, the controller providing second speed signals to the second motor for driving the second wheel, wherein the controller executes a stored program to:
(i) calculate a first amount of slip for the first wheel from the first wheel rotation signals received from the means for measuring wheel rotation,
(ii) calculate a second amount of slip for the second wheel from the second wheel rotation signals received from the means for measuring wheel rotation,
(iii) provide first speed signals to the first motor that cyclically decreases and increases speed of the first wheel if the first amount of slip has exceeded the predetermined first value of slip, and
(vi) provide second speed signals to the second motor that cyclically decreases and increases speed of the second wheel if the second amount of slip has exceeded the predetermined second value of slip.

6. A robotic device for treating a surface, comprising:
a first wheel driven by a first motor;
a second wheel driven by a second motor;
a housing supported by the first wheel and the second wheel;
means for measuring wheel rotation for the first wheel and the second wheel; and
a controller in communication with the first motor, the second motor, and the means for measuring wheel rotation, the controller receiving first wheel rotation signals associated with the first wheel from the means for measuring wheel rotation, the controller receiving second wheel rotation signals associated with the second wheel from the means for measuring wheel rotation, the controller providing first speed signals to the first motor for driving the first wheel, the controller providing second speed signals to the second motor for driving the second wheel,
wherein the controller executes a stored program to:
(i) calculate a first amount of slip for the first wheel from the first wheel rotation signals received from the means for measuring wheel rotation,
(ii) calculate a second amount of slip for the second wheel from the second wheel rotation signals received from the means for measuring wheel rotation, and
(iii) when the first amount of slip exceeds a predetermined first value of slip or the second amount of slip exceeds a predetermined second value of slip, provide first speed signals to the first motor and provide second speed signals to the second motor such that the device navigates in a wavy pattern.

7. The device of claim 6 wherein:
the first speed signals are provided to the first motor and the second speed signals are provided to the second motor such that relative wheel speed between the left wheel and the right wheel varies in a periodic fashion.

8. A robotic device for treating a surface, comprising:
a first wheel driven by a first motor;
a second wheel driven by a second motor;
a housing supported by the first wheel and the second wheel;
means for delivering a fluid onto the surface;
means for measuring wheel rotation for the first wheel and the second wheel; and
a controller in communication with the first motor, the second motor, the means for delivering a fluid, and the means for measuring wheel rotation, the controller receiving first wheel rotation signals associated with the first wheel from the means for measuring wheel rotation, the controller receiving second wheel rotation signals associated with the second wheel from the means for measuring wheel rotation, the controller providing first speed signals to the first motor for driving the first wheel, the controller providing second speed signals to the second motor for driving the second wheel, the controller providing fluid delivery signals to the means for delivering a fluid,
wherein the controller executes a stored program to:
(i) calculate a first amount of slip for the first wheel from the first wheel rotation signals received from the means for measuring wheel rotation,
(ii) calculate a second amount of slip for the second wheel from the second wheel rotation signals received from the means for measuring wheel rotation, and
(iii) when the first amount of slip exceeds a predetermined first value of slip or the second amount of slip exceeds a predetermined second value of slip, provide fluid delivery signals to the means for delivering a fluid such that fluid is not delivered onto the surface.

9. A robotic device for treating a surface, comprising:
a first wheel driven by a first motor;
a second wheel driven by a second motor;
a housing supported by the first wheel and the second wheel;
a sheet cleaning material disposed on the device;
means for delivering a fluid onto the sheet cleaning material;
means for measuring wheel rotation for the first wheel and the second wheel; and
a controller in communication with the first motor, the second motor, the means for delivering a fluid, and the means for measuring wheel rotation, the controller receiving first wheel rotation signals associated with the first wheel from the means for measuring wheel rotation, the controller receiving second wheel rotation signals associated with the second wheel from the means for measuring wheel rotation, the controller providing first speed signals to the first motor for driving the first wheel, the controller providing second speed signals to the second motor for driving the second wheel, the controller providing fluid delivery signals to the means for delivering a fluid,
wherein the controller executes a stored program to:
(i) calculate a first amount of slip for the first wheel from the first wheel rotation signals received from the means for measuring wheel rotation,
(ii) calculate a second amount of slip for the second wheel from the second wheel rotation signals received from the means for measuring wheel rotation, and
(iii) when the first amount of slip exceeds a predetermined first value of slip or the second amount of slip exceeds a predetermined second value of slip, provide fluid delivery signals to the means for delivering a fluid such that fluid is not delivered onto the sheet cleaning material.

* * * * *